US012651230B2

(12) United States Patent
Kim

(10) Patent No.: US 12,651,230 B2
(45) Date of Patent: Jun. 9, 2026

(54) METHOD AND DEVICE FOR SUPPORTING PACKING AND DELIVERY OF PRODUCTS BY USER

(71) Applicant: OASIS CO., LTD., Seongnam-si (KR)

(72) Inventor: Young Jun Kim, Seoul (KR)

(73) Assignee: OASIS CO., LTD., Seongnam-si (KR)

( * ) Notice: Subject to any disclaimer, the term of this patent is extended or adjusted under 35 U.S.C. 154(b) by 160 days.

(21) Appl. No.: 17/925,946

(22) PCT Filed: May 18, 2021

(86) PCT No.: PCT/KR2021/006192
§ 371 (c)(1),
(2) Date: Nov. 17, 2022

(87) PCT Pub. No.: WO2021/235817
PCT Pub. Date: Nov. 25, 2021

(65) Prior Publication Data
US 2023/0186232 A1      Jun. 15, 2023

(30) Foreign Application Priority Data
May 18, 2020      (KR) ........................ 10-2020-0058971

(51) Int. Cl.
*G06Q 10/087*           (2023.01)
*G06F 3/0482*           (2013.01)
            (Continued)

(52) U.S. Cl.
CPC ......... *G06Q 10/087* (2013.01); *G06K 7/1417* (2013.01); *G06Q 10/08355* (2013.01); *G06F 3/0482* (2013.01); *G06F 3/0488* (2013.01)

(58) Field of Classification Search
CPC ........... G06Q 10/087; G06Q 10/08355; G06Q 10/08; G06Q 10/083; G06Q 10/0832;
            (Continued)

(56) References Cited

U.S. PATENT DOCUMENTS

2006/0224273 A1*  10/2006  Cheng ..................... G06Q 10/08
                                                                700/215

FOREIGN PATENT DOCUMENTS

KR      10-2010-0114438 A      10/2010
KR      10-2013-0142216 A      12/2013
                  (Continued)

OTHER PUBLICATIONS

Rahman, Mohammad Sazzad. Machine Vision Techniques for Crane Workspace Mapping. University of Louisiana at Lafayette ProQuest Dissertations & Theses, 2015. (Year: 2015).*
(Continued)

*Primary Examiner* — Fawaad Haider
(74) *Attorney, Agent, or Firm* — Bridgeway IP Law Group, PLLC; Jihun Kim

(57)            ABSTRACT

A method for supporting the packing and delivery of products by a user, comprising: a step in which a Quick-response (QR) code on an order confirmation is scanned by the user; a step for providing packing precaution information and order detail information, including an ordered products list, on the basis of the QR code on the order confirmation; a step for displaying the packing precaution information in a first color when the packing precaution information is selected by the user; a step in which a specific product in the ordered product list is selected by the user when the packing of the specific product in the ordered product list has been completed; and a step for displaying the specific product in the first color when the specific product is selected.

4 Claims, 11 Drawing Sheets

(51) Int. Cl.
   *G06F 3/0488*          (2022.01)
   *G06K 7/14*            (2006.01)
   *G06Q 10/083*          (2024.01)

(58) Field of Classification Search
   CPC ......... G06Q 10/0833; G06Q 10/06316; G06Q
                 10/107; G06Q 10/1091; G06K 7/1417;
                 G06K 7/1404; G06K 19/06037; G06F
                 3/0482; G06F 3/0488; G06F 3/0484
   USPC ......................................................... 705/28
   See application file for complete search history.

(56)                References Cited

FOREIGN PATENT DOCUMENTS

| KR | 10-2016-0148152 | A  | 12/2016 |
| KR | 10-2018-0023177 | A  | 3/2018  |
| KR | 10-1994481      | B1 | 10/2019 |
| KR | 10-2231929      | B1 | 3/2021  |

OTHER PUBLICATIONS

Lin, Yu-Cheng et al. Developing Mobile BIM/2D Barcode-Based Automated Facility Management System. The Scientific World Journal, 2014 (Year: 2014).*

* cited by examiner

METHOD AND DEVICE FOR SUPPORTING PACKING AND DELIVERY OF PRODUCTS BY USER

TECHNICAL FIELD

The present invention relates to a method and a device for supporting packing and delivery of products by a user, and more particularly, to a method and a device for supporting a user to pack a specific product in a space such as a warehouse in which numerous products are stacked and packed to deliver the packed specific product to an orderer.

BACKGROUND ART

As a recent information era, delivery services subject to remote orders through the Internet or the like are being activated. In general, these services are composed of a series of procedures of picking products according to the orders, packing the picked products, and delivering the packed products to orderers.

However, since the type or number of products available to be ordered increases, and spaces such as warehouses are filled with various kinds of products, it is getting more difficult to efficiently find and pick products. In addition, since different packing methods and precautions subject to types of products increase, it is also getting harder to pack the products. In addition, there also have been various methods for delivering packed products, and non-face-to-face delivery is particularly in the spotlight. However, there is a possibility that the products may be lost. In other words, these services currently have various problems in picking, packing, delivery, and the like.

DISCLOSURE

Technical Problem

In order to solve the above mentioned problems, the present invention provides a method for supporting packing and delivery of products by a user.

In order to solve the above mentioned problems, an object of the present invention of the present invention is to provide a device for supporting packing and delivery of products by a user.

Technical Solution

In order to achieve the above objects, a method for supporting packing and delivery of products by a user, which is performed by the device for supporting packing and delivery of products according to one embodiment of the present invention, includes the steps of: scanning, by the user, a quick-response (QR) code of an order confirmation; providing packing precaution information and order detail information including an ordered product list, based on the QR code of the order confirmation; displaying the packing precaution information in a first color when the packing precaution information is selected by the user; enabling the user to select a specific product in the ordered product list when packing of the specific product in the ordered product list is completed; displaying the specific product in the first color when the specific product is selected; and enabling the user to switch a status of the ordered product list to a packing completed status when packing has been completed for all of products in the ordered product list.

The device for supporting packing and delivery of products according to one embodiment of the present invention to achieve the above objects includes a processor and a memory for storing at least one command executed through the processor, wherein the at least one command may be executed to enable a user to scan a quick-response (QR) code of an order confirmation, may be executed to provide packing precaution information and order detail information including an ordered product list based on the QR code of the order confirmation, may be executed to display the packing precaution information in a first color when the packing precaution information is selected by the user, may be executed to enable the user to select a specific product in the ordered product list when packing of the specific product in the ordered product list is completed, may be executed to display the specific product in the first color when the specific product is selected, and may be executed to enable the user to switch a status of the ordered product list to a packing completed status when packing has been completed for all of products in the ordered product list.

Advantageous Effects

According to the present invention, products can be efficiently packed while considering types and wrapping papers of the products.

According to the present invention, when a specific wrapping paper is entirely exhausted, the request for the exhausted specific wrapping paper can be efficiently performed.

According to the present invention, products in non-face-to-face delivery can be effectively delivered.

BEST MODE

Mode for Invention

Figure 1:
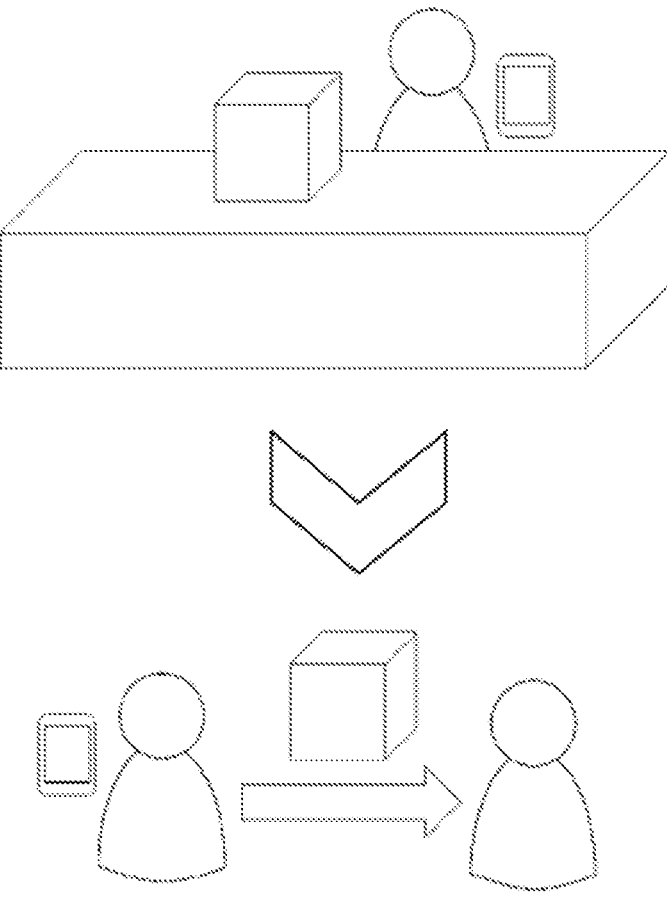
FIG. 1 is a diagram for explaining a method for supporting packing and delivery of products according to one embodiment of the present invention.

The present invention may be applied with various modifications and have various embodiments, and specific embodiments will be illustrated in the drawings and described in the detailed description in detail. However, it is not intended to limit the present invention to the specific embodiments, and it will be understood that the invention is intended to cover all modifications, equivalents, and alternatives falling within the spirit and scope without departing from the idea of the invention. Similar reference numerals are used for similar elements in describing the drawings.

Although the terms such as first, second, A and B may be used to describe various elements, the above elements will not be limited by the above terms. The terms are used only for the purpose of distinguishing one element from another element. For example, the first element may be referred to as the second element without departing from the scope of the present invention, and similarly, the second element may also be referred to as the first element. The term "and/or" includes any one of a plurality of relevant listed items or a combination thereof.

When one element is referred to as being "linked" or "connected" to other element, the element may be directly liked or connected to the other element, but it will be understood that another element may be present therebetween. On the contrary, when one element is referred to as being "directly linked" or "directly connected" to the other element, it will be understood that another element is not present therebetween.

The term used herein is merely for the purpose of illustrating a particular embodiment, and it is not intended to limit the present invention. The singular expression includes a plural expression unless the context clearly means otherwise. Herein, it will be understood that the term such as "include" and "have" is intended to designate the presence of feature, number, step, operation, element, component, or a combination thereof recited in the specification, which does not preclude the possibility of the presence or addition of one or more other features, numbers, steps, operations, elements, components, or combinations thereof.

Unless otherwise defined, all terms used herein including technical or scientific terms have the same meaning as commonly understood by those having ordinary skill in the art. Terms such as those defined in generally used dictionaries will be interpreted to have the meaning consistent with the meaning in the context of the related art, and will not be interpreted as an ideal or excessively formal meaning unless expressly defined in the present invention.

Hereinafter, exemplary embodiments of the present invention will be described in more detail with reference to the accompanying drawings. In order to facilitate the overall understanding in describing the present invention, the same reference numerals are used for the same components in the drawings, and redundant descriptions of the same components will be omitted.

FIG. 1 is a diagram for explaining a method for supporting packing and delivery of products according to one embodiment of the present invention.

Referring to FIG. 1, one embodiment of the present invention may support a user to pack at least one product according to an ordered product list, and support the user to deliver the packed product or a box that packs the product. The product packing may be performed by using picking boxes in which products are picked through a picking work, in other words, may refer to packing for products in the picking boxes.

According to one embodiment, various functions may be provided to support the packing and/or delivering of the user. In particular, when the quantity in the picking box is insufficient for a plurality of products, or when packing becomes complicated, for example, when the packing method is different for each product, the user can be effectively supported by using a QR code. In addition, delivery location information can be easily checked by using the QR code, a routing guide can also be directly provided by linking with a navigation system, and delivery completion in non-face-to-face delivery can be guaranteed by photographing an image. In addition, according to one embodiment, the attendance of the user can be efficiently managed by using the QR code in addition to the above-described packing and/or delivering.

In other words, according to one embodiment, the user may be provided with order detail information based on the QR code of the order confirmation, and supported to select packing precaution information or the number of products one by one, and check the corresponding information once again by changing colors upon completion of the selection. Accordingly, incorrect packing may be effectively prevented.

In addition, according to one embodiment, orderer's delivery location information and orderer's name information may be provided based on an invoice QR code, and the provided information may be compared to an invoice, so that corresponding information may be supported to be checked once again. Accordingly, likewise, incorrect delivering may be effectively prevented.

the method for supporting packing and/or delivery of products according to one embodiment may be performed by a computing device such as a smartphone or tablet, that is, a smart device, and may also be provided through an application or a web browser. In addition, since mobility or portability may be required for packing and/or delivering products, the smart device may be a portable device or a wearable device. In other words, the device for executing the product packing and/or delivery supporting method may be a device carried by the user or may be attached to a specific position, and frequently checked and operated by the user while packing and/or delivering products.

In addition, a device for the product packing supporting method and a device for the product delivery supporting method may be separately provided. In other words, when the user performing the packing and a person in charge of performing the delivery are different, the separated methods may be provided on different devices. However, one device may be provided with all functions, in which the packing supporting method may be provided in the device of the user performing packing, and the delivery supporting method may be provided in the device of the person in charge of performing delivery.

Hereinafter, the method for supporting packing of products will be described in detail together with screens of the device for providing the product packing supporting method or the product packing supporting device with reference to FIGS. 2 to 9. In addition, the method for supporting delivery of products will be described in detail together with screens of the device for providing the product delivery supporting method or the product delivery supporting device with reference to FIGS. 10 to 14.

FIGS. 2 to 7 are diagrams illustrating a screen of a user terminal performing the product packing supporting method according to one embodiment of the present invention.

FIGS. 2 to 7 may be screens showing a series of process of the product packing supporting method.

Figure 2:
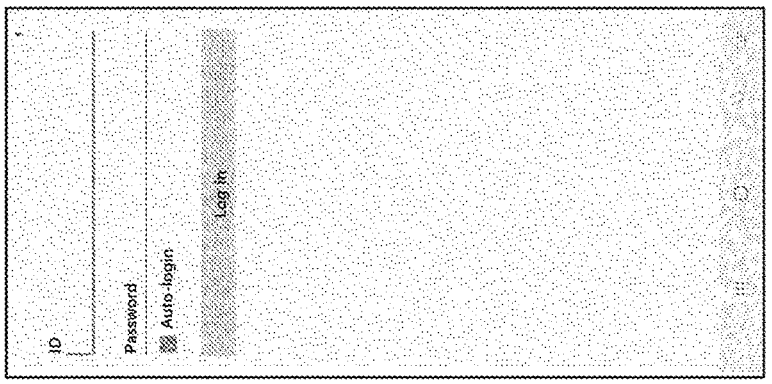
FIGS. 2 to 7 are diagrams illustrating a screen of a user terminal performing the product packing supporting method according to one embodiment of the present invention.
Figure 2:
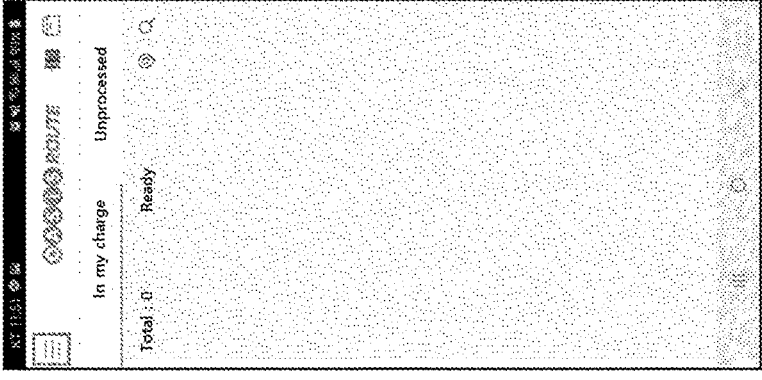
Figure 2:
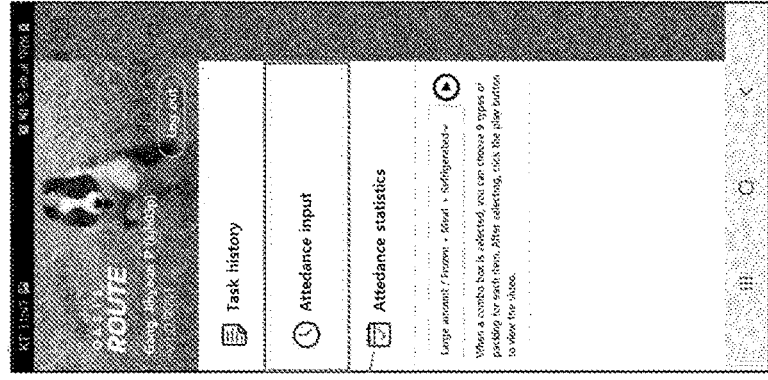

First, referring to FIG. 2, log-in may be performed by inputting account information of a user. The account information may include ID and password, and a separate certificate may be used.

According to one embodiment, when the account information may be obtained from the user, log-in may be performed based thereon, and information about corresponding tasks may be provided to the user. In addition, when the upper left icon is additionally selected, at least one of a task history check function, an attendance input function, and an attendance statistics check function may be provided to the user.

Figure 3:
Figure 3:
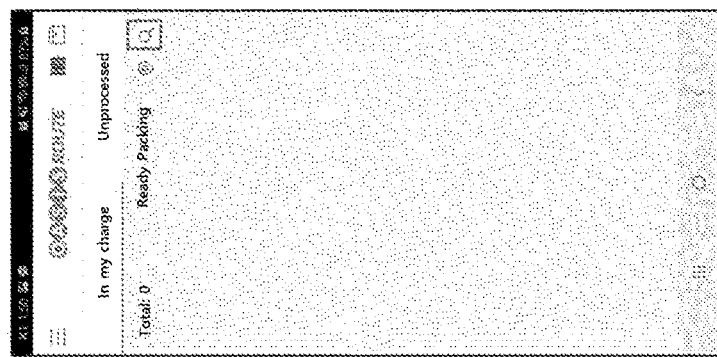
Figure 3:
Figure 3:
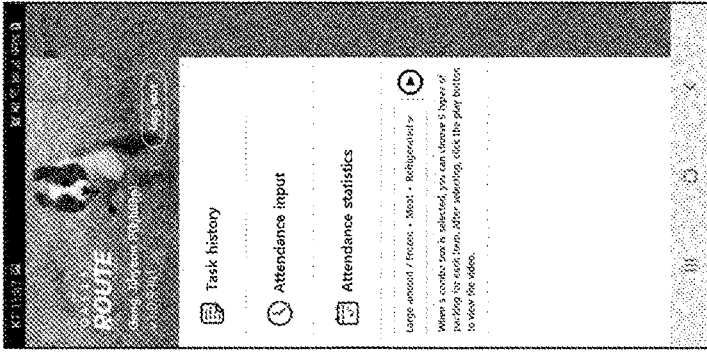
Figure 3:
Figure 3:
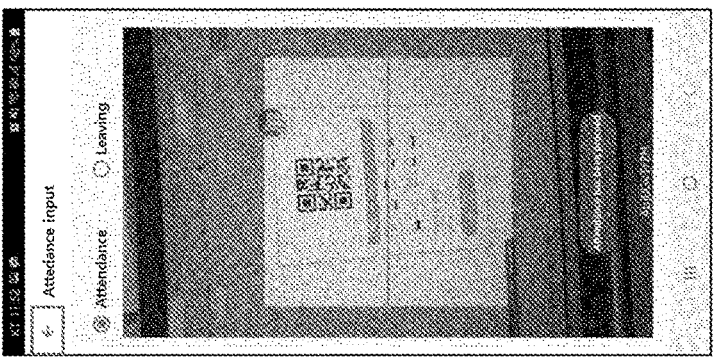
Figure 3:
Figure 4:
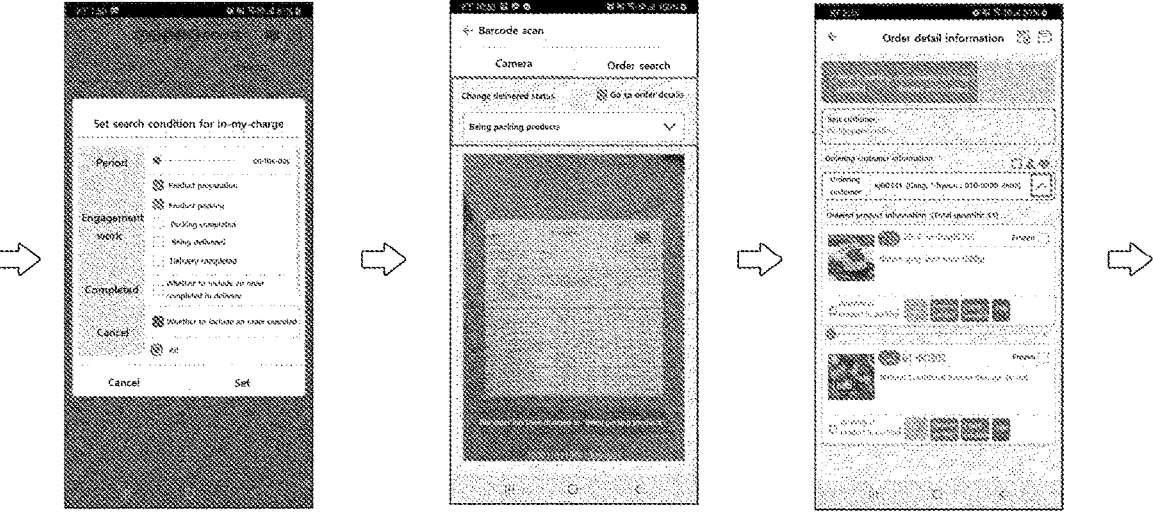

For example, according to one embodiment referring to FIG. 3, when the user selects the attendance input, information on one of coming to work or leaving from work may be selected by the user as an attendance status, and a quick response (QR) code may be scanned by the user. When the QR code is scanned, the attendance status selected by the user may be registered.

In other words, according to one embodiment, information on tasks in charge may be provided to the user. According to one embodiment, referring to FIG. 4, at least one of period information, participation task information, completion information and cancellation information may be selected in order to set conditions for searching for tasks in charge by the user. Thus, according to one embodiment, the information about the user's tasks in charge may be filtered and provided.

In addition, according to one embodiment, the barcode icon at an upper right corner may be selected by the user, and accordingly, the user may be provided with a screen of scanning the QR code, a list of delivering status changes, and a checkbox for going to the order details. In this case, the user may set the list of delivering status changes as Products being packed, check the checkbox for Going to order details, and then scan the QR code on the order confirmation. The order confirmation may be included in the picking box.

When the QR code is scanned after the checkbox for Going to order details is checked, order details corresponding to the QR code may be immediately provided on the screen. When the QR code is scanned without checking the checkbox for Going to order details, only the order information corresponding to the QR code may be included in the information about tasks in charge, and the order detail information may not be provided immediately.

For example, according to one embodiment, when the order detail information is provided immediately by scanning the QR code, packing precaution information may be displayed at the top of the screen. For example, the packing precaution information may include information about packing materials, such as recycling of packing materials and/or eco-friendly packing and addition of bottled water, information on whether an orderer is the best customer, and additional packing precautions. For example, the information related to packing materials among the packing precaution information may be displayed at the top, the information on whether an orderer is the best customer may be displayed below the information related to the packing materials, and the additional packing precautions may be displayed thereafter.

The information related to packing materials may be selected by the user among the packing precaution information, and the selected information related to packing materials may be changed to a different color, in other words, may be displayed in the different color. The different color may be referred to as a first color, for example, may be gray. However, the present invention is not limited thereto.

Figure 5:
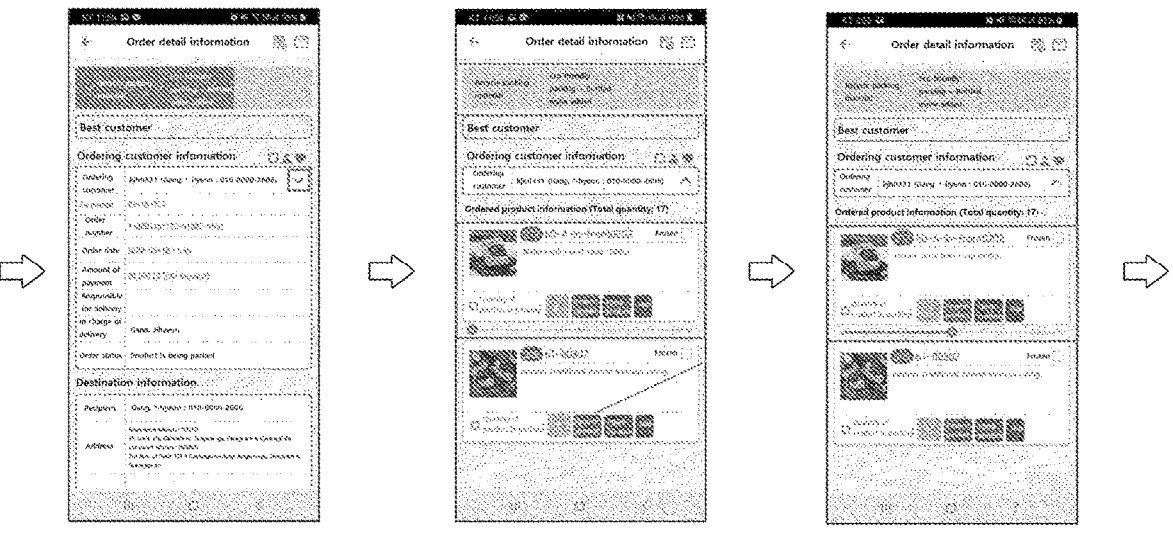

In addition, according to one embodiment, ordering customer information may be provided below the packing precaution information in the order detail information. When the ordering customer information is selected by the user, detailed information about the ordering customer may be provided as shown in FIG. 5. The detailed information about the ordering customer may include at least one of customer's ID, name information, contact information, order number, order date and time, payment amount, delivery person information, order status information, recipient name information, and delivery location information.

The user may check the ordering customer once again by comparing the detailed information about the ordering customer with the order confirmation. Thereafter, the user may proceed to the next step by checking a checkbox positioned at the right of the ordering customer information. In other words, a packing task may be performed.

According to one embodiment, ordered product information may be provided below the ordering customer information, the ordered product information may be displayed for each product, and may be displayed together with at least one of product name information, image information, quantity information, and packing type information such as frozen or refrigerated. In addition, according to one embodiment, each provide may be provided with a goods request icon for the product, a product check icon, or an icon for switching a status of the product into a skip, thereby allowing the user to switch the goods request or status for the product.

For example, according to one embodiment, when the corresponding product is not present in the picking box or the number of the product is less than a required quantity, a goods request for the product may be selected by the user. In this case, according to one embodiment, the user may input insufficient quantity information of the product and working location information of the user, and the status of the product may be switched to Requesting. Thereafter, additional products may be picked by other user based on the insufficient quantity information for the product switched into the requesting status, and the additionally picked products may be delivered to the user based on the working location information.

Alternatively, for example, according to one embodiment, when the corresponding product is not present in the picking box or the number of the product is less than a required quantity, the user may switch the status of the product to Skip. In this case, according to one embodiment, the product may be displayed in a different color. The different color may be a second color, and may be yellow. However, the present invention is not limited thereto.

Figure 6:
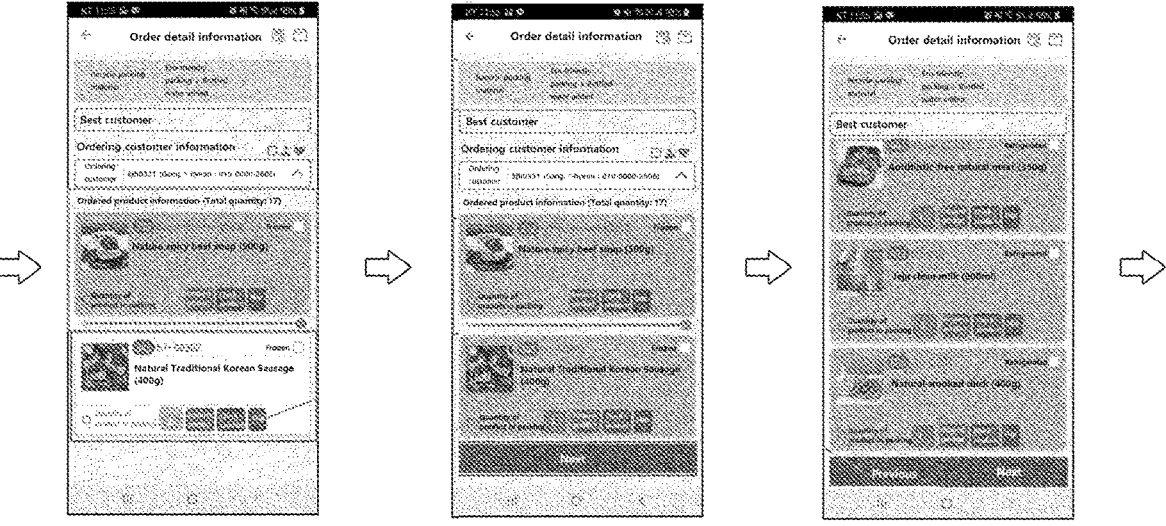

According to one embodiment, when the products in the picking box are the same as the products provided in the order detail information and the quantity is also identical, the product may be packed by the user, and the user may select the product in the order detail information with respect to the packed product. Thereafter, according to one embodiment, the selected product may be displayed in a different color. In addition, when there are multiple specific products as shown in FIG. 6, the user may select the products multiple times as the quantity of the products. According to one embodiment, when the specific products are selected multiple times, the specific products may be displayed is in a different color. The other color may be the first color, and may be gray. However, the present invention is not limited thereto. In addition, the number of times selected by the user relative to the total quantity of the specific products may be displayed as a bar mark at the bottom of the specific products. The order detail information may be compared to the products in the picking box during the above process, so that the products may be checked once again.

Figure 7:
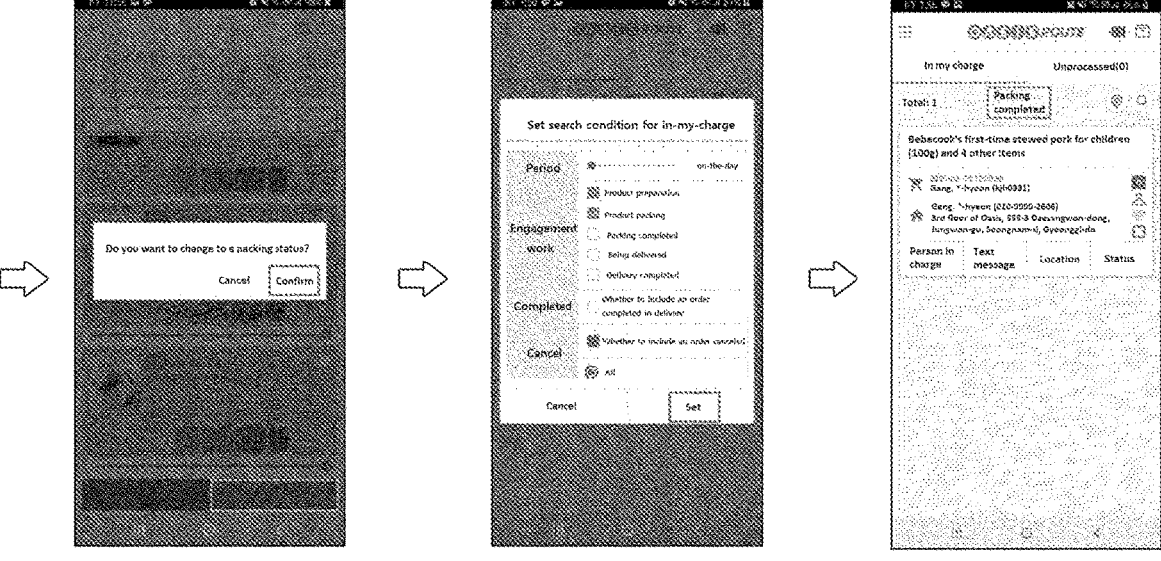

According to one embodiment, when the user selects all quantities for the particular products, the packing may be considered as being completed for the all quantities of the specific products, so that the same process may be repeated for next products. In addition, when the packings are completed for the all products in the ordered product list as shown in FIG. 7, the user may switch the status of the ordered product list to Packing completed. However, when some products in the ordered product list are skipped, a notification message about the skipped products may be provided to the user, and the status may not be changed to the Packing completed.

The ordered product list with the status switched to the Packing completed may be derived by performing filtering according to the condition setting from the information on tasks in charge, and the user may check the information about the ordered product list again. However, when some of the products in the ordered product list are in the Skipped or Requesting status, the status is not switched to the Packing completed and accordingly, the user may check a unprocessed product list. The ordered product list in the unprocessed product list may be selected so that, packing operation for the incomplete products may be performed.

Figure 8:
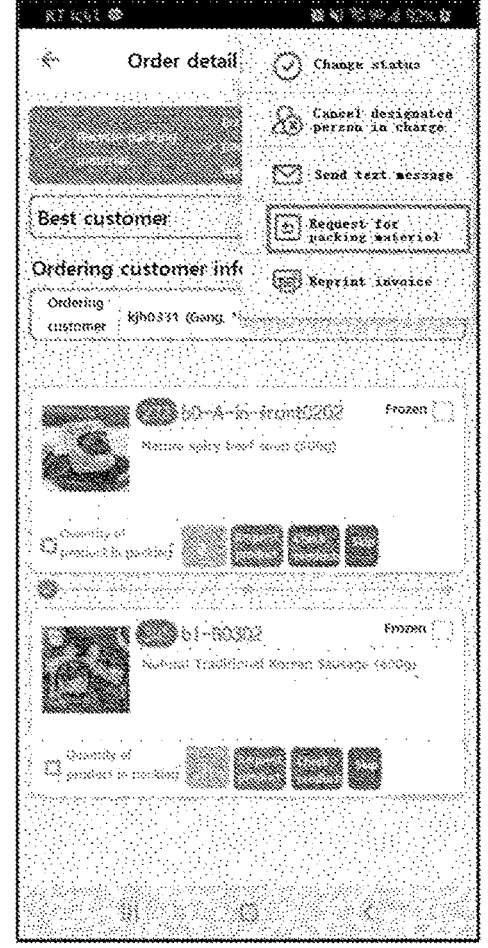
FIGS. 8 and 9 are diagrams showing a screen of a user terminal performing a request for a packing material according to one embodiment of the present invention.
Figure 8:
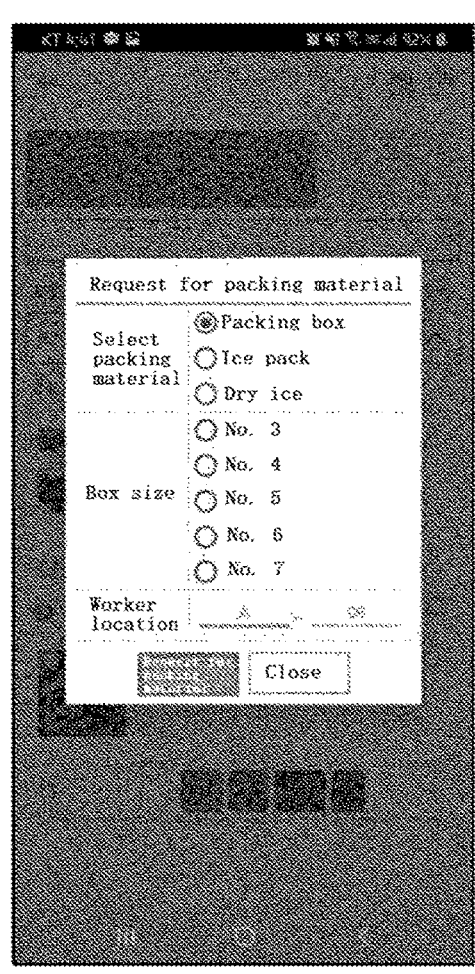
Figure 9:
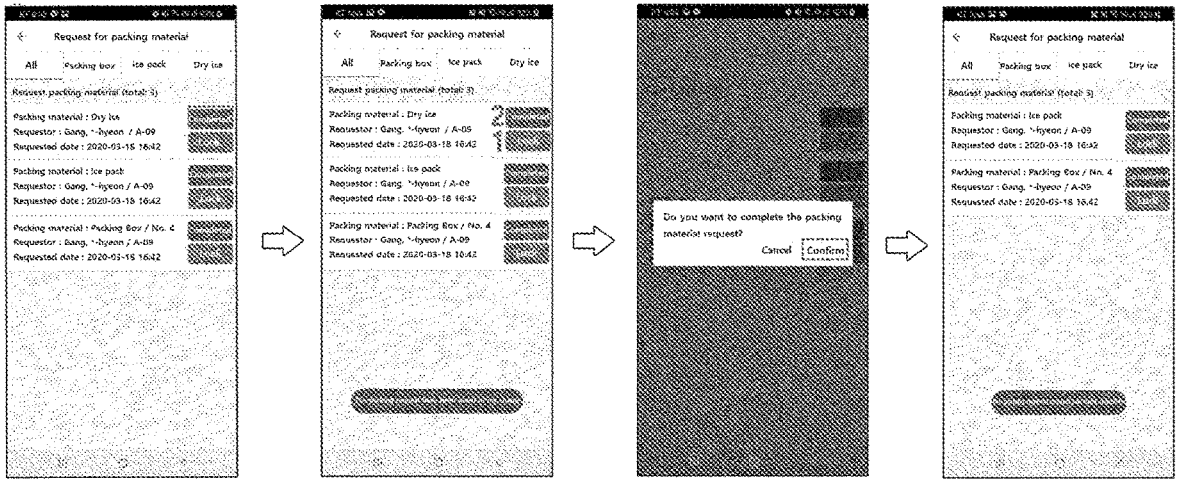

FIGS. 8 and 9 are diagrams showing a screen of a user terminal performing a request for a packing material according to one embodiment of the present invention.

FIG. 8 may be a screen of a user requesting packing materials. FIG. 9 may be a screen of another user delivering the packing materials according to the packing material request.

The user may use different types of packing materials to pack products, and may request packing materials when at least one packing material is exhausted and out of stock.

In this case, referring to FIG. 8, the user may select a menu in the upper right corner, and may select the Request packing materials in the menu. According to one embodiment, information on types and sizes of the packing material (number information), and user's working location information may be inputted by the user, and the packing material request may be registered based thereon. At least one of a packing box, an ice pack, and dry ice may be selected as the type of packing material.

The registered packing material request may be included in a packing material request list, and each packing material request item in the list may be displayed together with at least one of packing material type and size information, a requestor, working location information, and a request date.

Referring to FIG. 9, the other user may check the packing material request items in the packing material request list, and may select a Lock for a specific item. In this case, the specific item may be assigned to the other user having selected the Lock, and another user may be prevented from processing the specific item.

Thereafter, the other user may transfer the packing material to the user, and may switch a status of the specific item in the packing request list to Completed. However, the status as the Completed may be switched by the user having requested the packing material. Thereafter, the packing material request item having been switched to the Completed status may disappear from the packing material request list.

FIGS. 10 to 13 are diagrams showing a screen of a user terminal performing the product delivery supporting method according to one embodiment of the present invention.

FIGS. 10 to 13 may be screens showing a series of process of the product delivery supporting method. In addition, hereinafter, the user may represent a person in charge of delivery.

Figure 10:
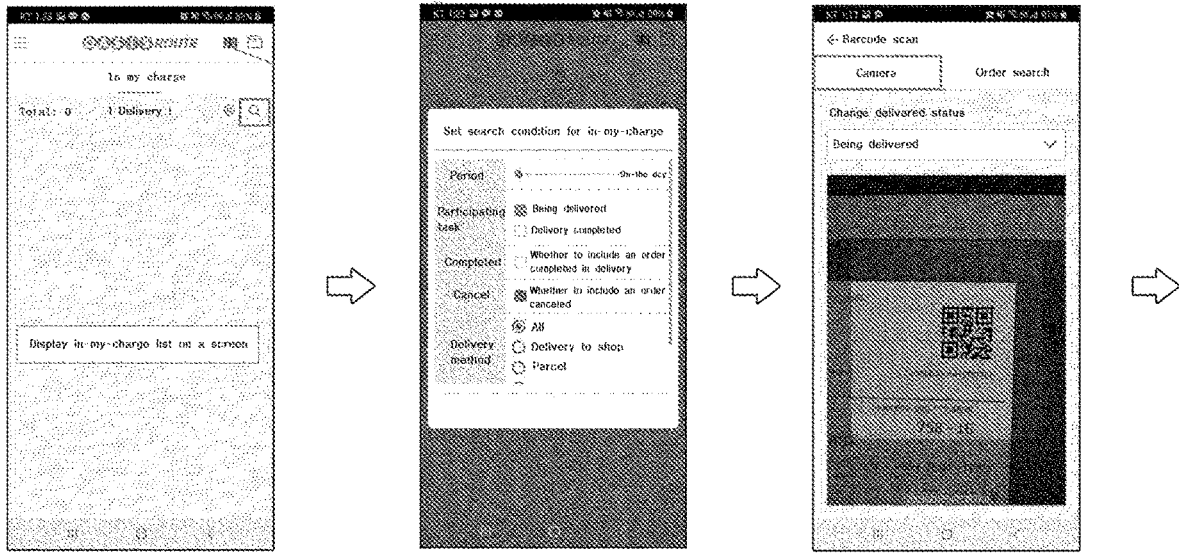
FIGS. 10 to 13 are diagrams showing a screen of a user terminal performing the product delivery supporting method according to one embodiment of the present invention.

First, referring to FIG. 10, log-in may be performed by inputting account information of the user as shown in FIG. 2, and information about corresponding tasks may be provided to the user.

According to one embodiment, in order to set conditions for searching for tasks in charge by the user, at least one of period information, participation task information, completion information, cancellation information and delivery method may be selected. In other words, according to one embodiment, the information about the user's tasks in charge may be filtered and selectively provided thereby.

In addition, according to one embodiment, the barcode icon at an upper right corner may be selected by the user, and accordingly, the user may be provided with a screen of scanning the QR code and a list of delivering status changes. In this case, the user may set the list of delivering status changes as Being delivered, and may scan the QR code on the invoice.

Figure 11:
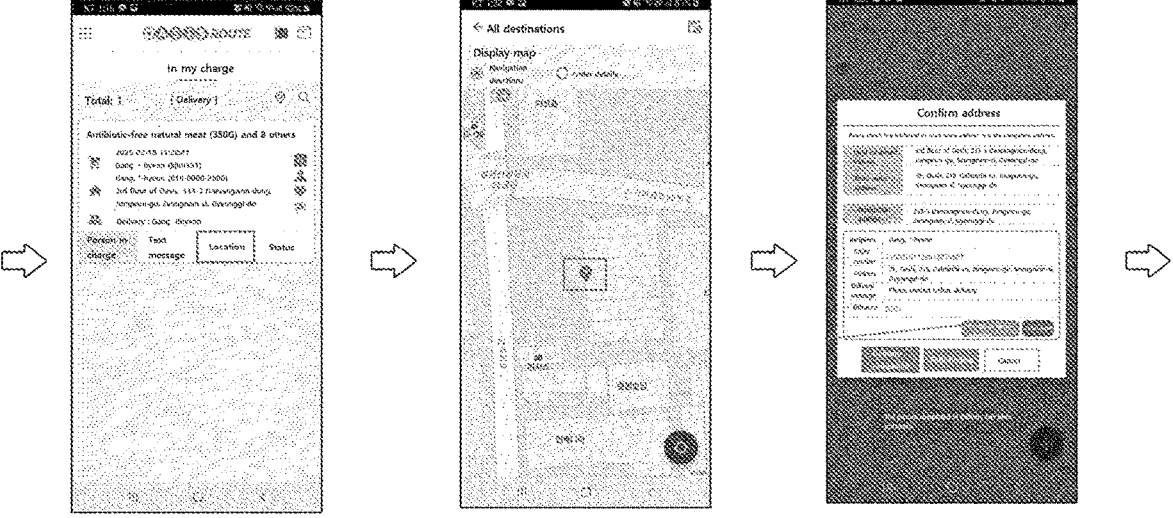

For example, according to one embodiment referring to FIG. 11, when the QR code on the invoice is scanned, delivery information corresponding to the QR code may be included in the list in charge. When QR codes of a plurality of invoices are scanned, a plurality of delivery information may be included together in the list in charge. The delivery information may include at least one of brief name information of products, name information of an orderer, an order date, contact information of the orderer, delivery location information and delivery person information. In addition, an icon for sending a text message to the orderer, a location check icon, and a status icon may be provided together.

According to one embodiment, when the location check icon is selected by the user, the delivery location information may be displayed on a map and provided to the user. In other words, the delivery location information may be displayed on the screen while indicating a marker on the map. Thereafter, according to one embodiment, the name information of the orderer (or recipient) may be displayed when the marker is selected by the user. In addition, according to one embodiment, when the name information is selected by the user, the delivery detail information may be provided. The process of displaying the name information may be omitted, and delivery detail information may be provided immediately when the marker is selected.

For example, the delivery detail information may include at least one of information on land lot-based address, road name address, or navigation address for the delivery location information, recipient name information, order number information, recipient address information, delivery message information and door access information. In addition, at least one of a delivery completion icon, a path-finding icon, an order details icon and a photo-taking icon may be provided together.

Figure 12:
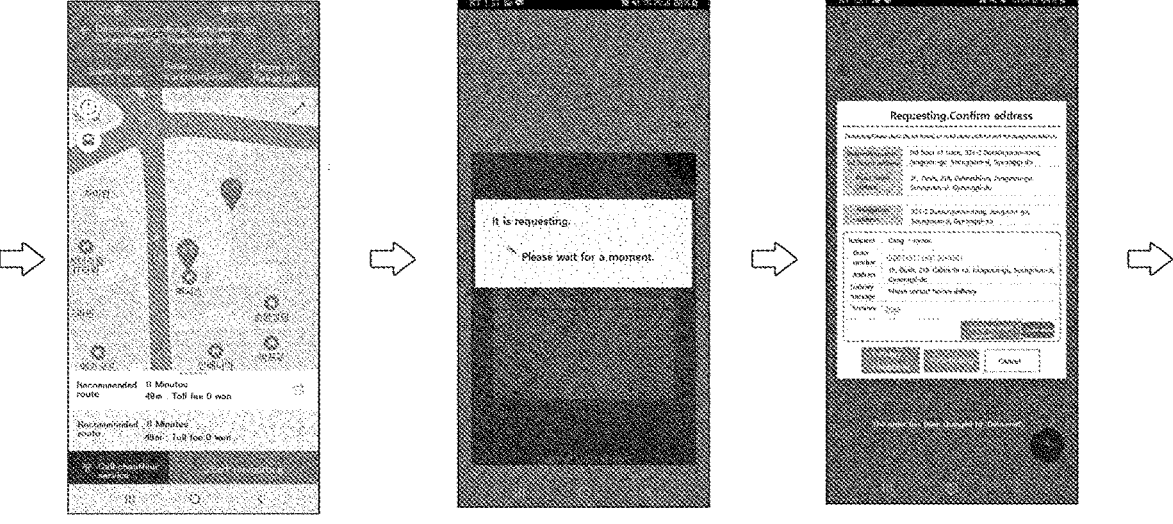

Referring to FIG. 12, according to one embodiment, when the path-finding icon is selected by the user, a delivery route may be provided to the user, and the navigation may be immediately provided in conjunction with a navigation system.

Thereafter, according to one embodiment, when the user arrives at the delivery location of the orderer (or recipient) through the above-described process and completes the delivery of the packed products (or boxes), the barcode icon in the upper right corner may be selected by the user once again, so that the user may be provide with a screen of scanning the QR code and a list of delivering status changes. The user may set the delivery status change list as Delivery completed, and may scan the QR code on the invoice.

Figure 13:
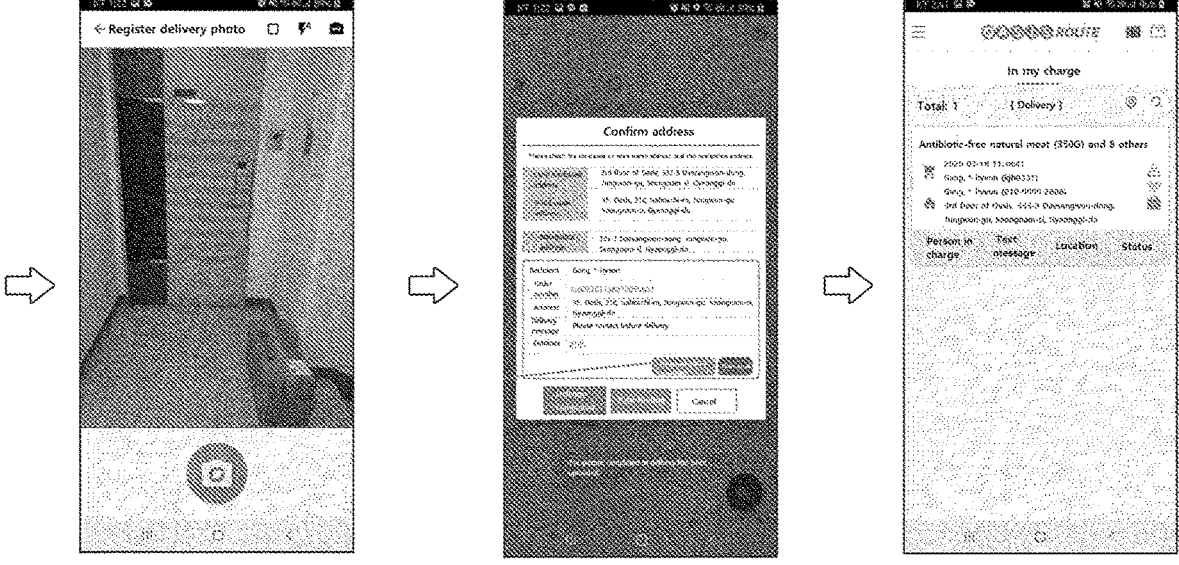

According to one embodiment, when the QR code on the invoice is scanned, delivery detail information corresponding to the QR code may be provided to the user again. The user may select the photo-taking icon in the delivery detail information, and as shown in FIG. 13, may obtain image information by taking an image including the packed box and a space capable of identifying the delivered location (for example, the recipient's front door or the like). Thereafter, according to one embodiment, the user may select the status as Delivery completed based on the image information. However, the image information may be changed by re-photographing before the user selects the status as Delivery completed. In other words, the status of Delivery completed may be switched based on the image information, and may not be switched when there is no image information. In addition, according to one embodiment, a message may be sent to the orderer or recipient along with taking the image, and then the status may be switched as Delivery completed based on the image information and the message informa-tion. When the status is switched as Delivery completed, the image information and/or the message information may be delivered immediately to the orderer or recipient.

The delivery or task having switched to the Delivery completed status may be derived by performing filtering according to the condition setting from the information on tasks in charge, and the user may check the delivery detail information again.

Figure 14:
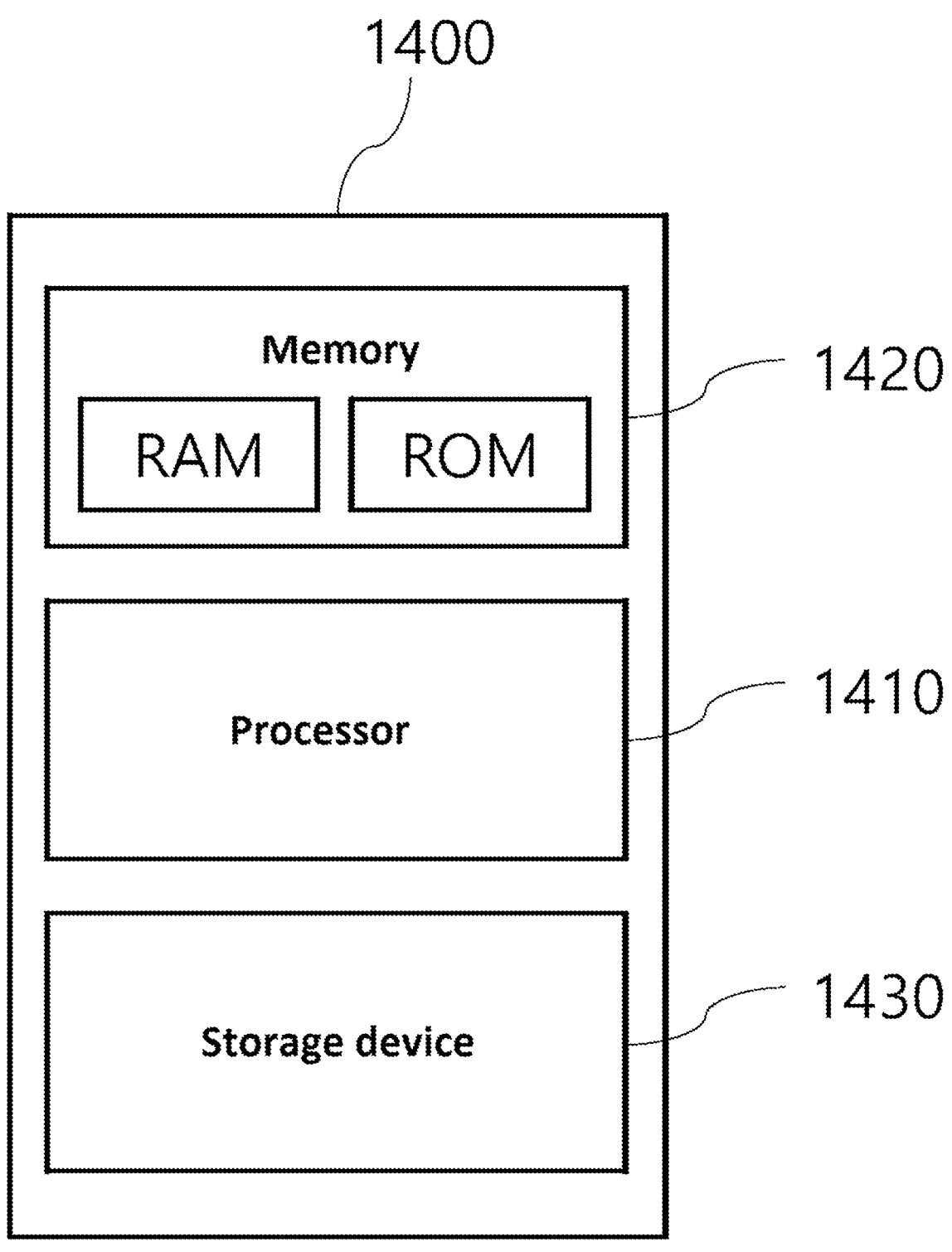
FIG. 14 is a block diagram showing the device for supporting packing and delivery of products according to one embodiment of the present invention.

FIG. 14 is a block diagram showing the device for supporting packing and delivery of products according to one embodiment of the present invention.

Referring to FIG. 14, a device 1400 for supporting packing and delivery of products according to one embodi-ment of the present invention may include at least one processor 1410, a memory 1420, and a storage device 1430. For example, the device for supporting packing and delivery of products may be a computing and portable user terminal such as a smartphone or tablet, and may provide functions according to the embodiments through applications.

The processor 1410 may execute a program command stored in the memory 1420 and/or the storage device 1430. The processor 1410 may refer to a central processing unit (CPU), a graphics processing unit (GPU), or a dedicated processor on which the methods according to the present invention are performed. The memory 1420 and the storage device 1430 may be formed of a volatile storage medium and/or a non-volatile storage medium. For example, the memory 1420 may include a read only memory (ROM) and/or a random access memory (RAM).

The memory 1420 may store at least one command executed through the processor 1410. The at least one command may include a command for enabling the user to scan the quick-response (QR) code of the order confirma-tion, a command for providing packing precaution informa-tion and order detail information including an ordered product list based on the QR code of the order confirmation, a command for displaying the packing precaution informa-tion in a first color when the packing precaution information is selected by the user, a command for enabling the user to select a specific product in the ordered product list when packing of the specific product in the ordered product list is completed, a command for displaying the specific product in the first color when the specific product is selected, and a command for enabling the user to switch a status of the ordered product list to a packing completed status when packing has been completed for all of products in the ordered product list.

When the specific product is selected the command for displaying the specific product in the first color may include a command for displaying the specific product in the first color when the user selects the specific product as many as the quantity thereof. The device for supporting packing and delivery of products may support a touch interface. In other words, the device for supporting packing and delivery of products is operated by the user, and accordingly, may also refer to a user terminal for supporting a touch interface. In this case, the selection of the specific product by the user may be performed based on the touch interface of the user terminal displaying the specific product subject to the ordered product list. In particular, the user may minimize mistakes by manipulating the terminal with the same num-ber of touches as the number of items. For example, when the order quantity is n for the same item, the user may be required to touch the device n times before proceeding to the next step.

Alternatively, the selection of the specific product by the user may be performed by confirming the last three digits of a barcode for the specific product, or may be performed by scanning the barcode. Alternatively, when the selection cannot be performed based on the above-described touch interface, the selection may be performed by confirming the last three digits of the barcode of a particular product. Even when the above scheme cannot be performed, the selection may be performed by scanning the barcode itself.

For example, the at least one command may further include a command for obtaining account information of the user, a command for enabling the user to select an atten-dance status indicating coming to work or leaving from work, a command for enabling the user to scan an attendance confirmation QR code, and a command for registering an attendance or leave according to the attendance status based on the account information and the attendance confirmation QR code.

Alternatively, for example, the at least one command may further include a command for enabling the user to select a product request for a specific product when the specific product in the ordered product list is not present in the picking box, and a command, when the product request is selected, for obtaining insufficient quantity information of the specific product and work location information of the user by the user, and switching the status of the specific product to Requesting. The picking box may include prod-ucts picked based on the ordered product list.

Alternatively, for example, the at least one command may further include a command for enabling the user to switch the status of the specific product to Skip when the specific product in the ordered product list is not present in the picking box, a command for displaying the specific product in a second color when the status of the specific product is switched to the Skip, and a command for providing a notification message for the skipped products when all products other than the specific product in the ordered product list are entirely packed.

Alternatively, for example, the at least one command may further include a command for enabling the user to select a packing material request when at least one packing material used for packing the specific product is not present, a command for enabling the user to obtain type information and size information of the packing material and the work-ing location information of the user, and registering the packing material request, a command for other user to select a lock for the registered packing material request, and a command for the other user to switch a status of the registered packing material request to Completed, when the other user delivers a packing material subject to the regis-tered packing material request to the user.

For example, the at least one command may further include a command for enabling a delivery person to scan an invoice QR code for a packed box, a command for providing map-based delivery location information and orderer name information based on the invoice QR code, a command for providing delivery detail information to select Delivery completion or Path-finding when the orderer name information is selected by the delivery person, and a command for providing a routing guide based on the delivery location information when the Path-finding is selected by the delivery person. The packed box may include packed products subject to the ordered product list with the status switched to Packing completed.

In addition, the at least one command may further include a command for enabling the delivery person to scan the invoice QR code when delivery of the packed box is completed, a command for providing the delivery detail information based on the invoice QR code, a command for obtaining image information by enabling the delivery person to take an image including a space for identifying the packed box and a delivered location, and a command for enabling the delivery person to switch a delivery status of the packed box to Delivery completed based on the image information.

Figure 15:
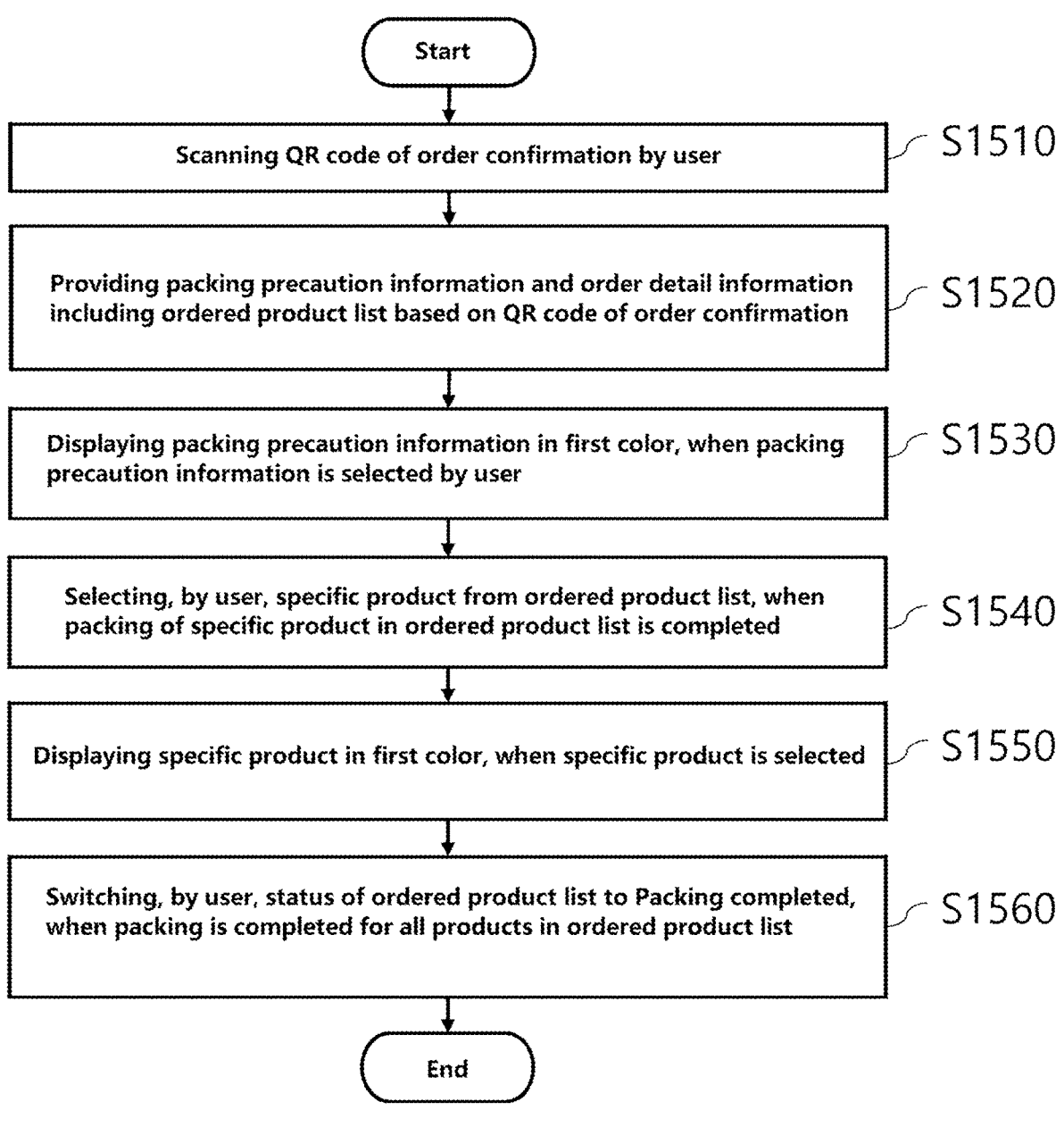
FIG. 15 is a flowchart showing the method for supporting packing and delivery of products according to one embodiment of the present invention.

FIG. 15 is a flowchart showing the method for supporting packing and delivery of products according to one embodiment of the present invention.

Referring to FIG. 15, according to one embodiment, first, a quick-response (QR) code of an order confirmation may be scanned by the user (S1510). However, the user may register an attendance status before scanning the QR code. In this case, the user may log in by inputting account information, select the attendance status as Coming to work or Leaving from work, and register the selected Coming or Leaving by scanning an attendance confirmation QR code.

In addition, according to one embodiment, the user may be provided with packing precaution information and order detail information including an ordered product list based on the QR code of the order confirmation (S1520). The order detail information may further include ordering customer information including information on whether the customer is the best customer, and the ordered products list may include at least one of quantity information for each product and packing type information such as frozen or refrigerated.

Thereafter, according to one embodiment, when the packing precaution information is selected by the user, the packing precaution information may be displayed in a first color (S1530). The first color may be gray. However, any other color may be set to distinguish before and after being selected, and the present invention is not limited thereto.

According to one embodiment, when packing of the specific product in the ordered product list is completed, a specific product may be selected from the ordered product list by the user (S1540). When the specific product is selected, the specific product may be displayed in the first color (S1550). The specific product may include multiple specific products. In this case, when the user selects the specific product as many as the quantity thereof, the specific product may be displayed in the first color. When the device supports a touch interface according to one embodiment, the selection of the specific product by the user may be performed by the user based on the touch interface. Alternatively, the selection of the specific product by the user may be performed by confirming the last three digits of a barcode for the specific product, or may be performed by scanning the barcode. However, the present invention is not limited thereto.

For example, the barcode scanning may be required by other conditions for the above-described selection of the specific product by the user. For example, it may be set to require only the barcode scanning other than the touch interface, with respect to a user who make frequent mistakes based on misdelivery history information. Alternatively, it may be set to require only the barcode scanning other than the touch interface, with respect to products with frequent mistakes based on the misdelivery history information. The misdelivery history information may include damage information or customer claim information. For example, according to one embodiment, when the misdelivery history is at least the preset number of times, notification information may be provided to the user, and only the barcode scanning may be required as described above.

According to one embodiment, when packing has been completed for all of products in the ordered product list, the user may switch the status of the ordered product list to Packing completed (S1560).

For example, although not shown in FIG. 15, according to one embodiment, when the specific product in the ordered product list is not present in the picking box, a goods request for the product may be selected by the user. When the product request is selected, insufficient quantity information of the specific product and work location information of the user may be obtained by the user, and the status of the product may be switched to Requesting. The picking box may refer to a box including products picked based on the ordered product list.

Alternatively, for example, according to one embodiment, when the specific product in the ordered product list is not present in the picking box, the user may switch the status of the product to Skip. When the status of the specific product is switched to the Skip, the specific product may be displayed in a second color. When all products other than the specific product in the ordered product list are entirely packed, a notification message about the skipped products may be provided to the user. The second color may be yellow. However, any other color different from the first color may be set, and the present invention is not limited thereto.

Alternatively, for example, according to one embodiment, when at least one packing material used for packing the specific product is not present, the user may select a packing material request, the user may obtain type information and size information of the packing material and the working location information of the user, and the packing material request may be registered.

Thereafter, other user may select a lock for the registered packing material request. When the other user delivers a packing material subject to the registered packing material request to the user, the other user may switch a status of the registered packing material request to Completed. Alternatively, the user may switch the status of the packing material request to Completed.

Alternatively, for example, according to one embodiment, the delivery person may scan an invoice QR code for a packed box, and map-based delivery location information and orderer name information may be provided based on the invoice QR code.

Thereafter, when the orderer name information is selected by the delivery person, delivery detail information for allowing a selection of Delivery completion or Path-finding may be provided. When the Path-finding is selected by the delivery person, a routing guide may be provided based on the delivery location information. The packed box may refer to a box containing packed products subject to the ordered product list with the status switched to Packing completed. The routing guide may refer to a navigation function.

In addition, when delivery of the packed box is completed, the delivery person may scan an invoice QR code again, and the delivery detail information may be provided again based on the invoice QR code. Thereafter, the delivery person may photograph an image including a space for identifying the packed box and the delivery location (for example, an orderer's front door or a front of the front door), so as to obtain image information. The delivery person may switch a delivery status of the packed box to Delivery completed based on the image information.

The operation described with reference to FIG. 15 is merely an example and may be a part of the operations according to the embodiment of the present invention. In other words, although not shown in FIG. 15, the embodiment of the present invention it is apparent that various operations described with reference to FIGS. 1 to 14 or some of the various operations may be further performed.

The operation according to the embodiments of the present invention may be implemented as a computer-readable program or code in a computer-readable recording medium. The computer-readable recording medium includes any kind of recording device for storing data to be read by a computer system. In addition, the computer-readable recording medium may be distributed to computer systems via networks, so as to store and execute the computer readable program or code in a distributed manner.

In addition, the computer-readable recording medium may include a hardware device specially configured to store and execute a program command such as ROM, RAM, and flash memory. The program command may include a high-level language code to be executed by a computer using an interpreter or the like as well as a machine code generated by a compiler.

Some aspects of the present invention have been described in the context of the device. However, the aspects may also represent the description according to the corresponding method, and the block or device herein corresponds to a method step or features of the method step. Similarly, aspects described in the context of a method may also represent features of a corresponding block or item or a corresponding device. Some or all of the method step may be performed, for example, by (or using) a hardware device such as a microprocessor, a programmable computer, or an electronic circuit. In some embodiments, one or more of the most important method steps may be performed by the above device.

In the embodiments, a programmable logic device (for example, a field programmable gate array) may be used to perform some or all of functions of the methods described herein. In the embodiments, the field programmable gate array may be operated with a microprocessor for performing one of the methods described herein. In general, it may be preferable that the methods are performed by a predetermined hardware device.

Although the present invention has been described with reference to exemplary embodiments, it will be apparent to a person having ordinary skill in the art that various modifications and variations can be made in the present invention without departing from the scope and field of the following appended claims.

The invention claimed is:

1. A portable device for supporting packing and delivery of products, the portable device comprising:
a memory to store a set of instructions;
a processor;
a display screen; and
a scanning interface,
wherein the set of instructions, when executed by the processor, performs a method comprising:

scanning, by the scanning interface, a quick-response code (QR) code of an order confirmation;

providing a packing precaution information and an order detail information including an ordered product list based on the QR code of the order confirmation when the QR code on the order confirmation is scanned;

displaying, on the display screen, the packing precaution information in a first color different from a color before selection when an input for selecting the packing precaution information is received through a touch interface of the display screen, wherein the first color enhances visual distinction to reduce packing errors;

displaying, on the display screen, a specific product in the first color when packing of the specific product in the ordered product list is completed and when an input for selecting the specific product from the ordered product list is received through the touch interface or the scanning interface, wherein when the specific product in the ordered product list is not present in a packed box, receiving an input for switching a status of the specific product to a skip status, displaying the specific product on the display screen in a second color different from the first color, and providing a notification message for the specific product with the skip status when all products other than the specific product with the skip status in the ordered product list are entirely packed, and wherein the displaying of the specific product in the first color on the display screen when the input for selecting the specific product is received includes:
displaying, on the display screen, a number of times of receiving the input for selecting the specific product relative to a total quantity of the specific product in a bar shape below the specific product, wherein the input for selecting the specific product is performed by touching the touch interface an order number of times when an order quantity of the specific product is the order number of times to reduce an order error of the specific product, wherein the input for selecting the specific product is received only through a barcode scanning of the specific product by the scanning interface when the specific product is subject to a first misdelivery history information with a preset number of times or more of misdelivery, and is received through the barcode scanning of the specific product or the touch interface when the specific product is subject to a second misdelivery history information with less than the preset number of times of misdelivery, and wherein each of the first misdelivery history information and the second misdelivery history information includes a damage information or a customer claim information;

switching a status of the ordered product list to a packing completed status when a packing for all of products in the ordered product list is completed;

scanning, by the scanning interface, an invoice QR code for the packed box containing packed products subject to the ordered product list with the status switched to the packing completed status and providing a map-based delivery location information and an orderer name information on the display screen based on the invoice QR code when the invoice QR code is scanned for the packed box;

providing a delivery detail information to select a delivery completion or a path-finding when an input for selecting the orderer name information is received through the touch interface;

providing a routing guide on the display screen based on the map-based delivery location information when an input for selecting the path-finding is received through the touch interface;

scanning the invoice QR code once again after the delivery of a packet box is completed and providing the delivery detail information on the display screen based on the invoice QR code;

obtaining an image information including a space for identifying the packed box and a delivered location to generate a message information;

switching a status of delivery of the packed box to delivery completed based on the image information and the message information; and providing the image information and the message information to a terminal of an orderer in the orderer name information when the status of the delivery is switched to the delivery completed.

2. The portable device of claim 1, wherein an attendance status of a user is registered by:

obtaining an account information of the user;

receiving an input for selecting the attendance status of the user at work; and registering the attendance status based on the account information and an attendance confirmation QR code when the attendance confirmation QR code is scanned.

3. The portable device of claim 1, wherein the packing of the specific product comprises:

receiving an input for selecting a product request for the specific product when the specific product in the ordered product list is not present in the packed box; and obtaining an insufficient quantity information of the specific product and a work location information of a user, and switching the status of the specific product to a requesting status, wherein the packed box includes products picked based on the ordered product list.

4. The portable device of claim 1, wherein the packing of the specific product comprises:

receiving an input for selecting a packing material request when at least one packing material used for packing the specific product is not present;

registering the packing material request by obtaining a type information and a size information of the at least one packing material and a working location information of a user;

receiving an input for selecting a lock for the packing material request through another user terminal; and switching a status of the packing material request to a completed status.

* * * * *